(12) United States Patent
Ogawa et al.

(10) Patent No.: US 10,862,363 B2
(45) Date of Patent: Dec. 8, 2020

(54) MOTOR

(71) Applicant: Nidec Corporation, Kyoto (JP)

(72) Inventors: Kosuke Ogawa, Kyoto (JP); Takashi Hattori, Kyoto (JP); Shunsuke Murakami, Kyoto (JP); Takao Atarashi, Kyoto (JP); Hidehiro Haga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 203 days.

(21) Appl. No.: 15/750,850

(22) PCT Filed: Aug. 9, 2016

(86) PCT No.: PCT/JP2016/073480
§ 371 (c)(1),
(2) Date: Feb. 7, 2018

(87) PCT Pub. No.: WO2017/026492
PCT Pub. Date: Feb. 16, 2017

(65) Prior Publication Data
US 2018/0248438 A1 Aug. 30, 2018

(30) Foreign Application Priority Data

Aug. 10, 2015 (JP) .................................. 2015-158390
Mar. 30, 2016 (JP) .................................. 2016-068372

(51) Int. Cl.
*H02K 3/50* (2006.01)
*H02K 5/16* (2006.01)
*H02K 3/52* (2006.01)

(52) U.S. Cl.
CPC .............. *H02K 3/505* (2013.01); *H02K 3/50* (2013.01); *H02K 3/52* (2013.01); *H02K 3/522* (2013.01);
(Continued)

(58) Field of Classification Search
CPC .......... H02K 1/14; H02K 1/146; H02K 1/148; H02K 1/16; H02K 1/165; H02K 3/12;
(Continued)

(56) References Cited

U.S. PATENT DOCUMENTS 8,089,183 B2 1/2012 Schwaiger
8,384,257 B2 2/2013 Kinugawa et al.
(Continued)

FOREIGN PATENT DOCUMENTS

JP 2014-138499 A 7/2014
JP 2014-158409 A 8/2014
(Continued)

OTHER PUBLICATIONS

Official Communication issued in International Patent Application No. PCT/JP2016/073480, dated Oct. 11, 2016.
(Continued)

*Primary Examiner* — Quyen P Leung
*Assistant Examiner* — Eric Johnson
(74) *Attorney, Agent, or Firm* — Keating & Bennett

(57) ABSTRACT

In a motor, a wire support member includes a wire holding portion that holds one portion of coil lead wires among the coil lead wires extending upward from a coil, a first conducting member that electrically connects the other portion of the coil lead wires to each other, and a main body portion that supports the wire holding portion and a first conducting member, a bus bar unit includes a second conducting member connected to the coil lead wire held by the wire holding portion, and a bus bar holder that holds the second conducting member. A bearing holder includes a through-hole which penetrates the bearing holder in an axial direction and through which a coil end of the coil lead wire or the second conducting member passes.

21 Claims, 11 Drawing Sheets

(52) U.S. Cl.
CPC ......... *H02K 5/161* (2013.01); *H02K 2203/09* (2013.01)

(58) Field of Classification Search
CPC .. H02K 3/18; H02K 3/38; H02K 3/46; H02K 3/52; H02K 3/521; H02K 3/522; H02K 7/083; H02K 2203/06; H02K 2203/09; H02K 3/50; H02K 5/161; H02K 5/173; H02K 5/1732
USPC ......................................................... 310/71
See application file for complete search history.

(56) References Cited

U.S. PATENT DOCUMENTS

| | | | |
|---|---|---|---|
| 9,601,958 B2 | 3/2017 | Yamaguchi et al. | |
| 2003/0201688 A1* | 10/2003 | Yamamura | H02K 3/50 310/71 |
| 2007/0182265 A1* | 8/2007 | Makino | H02K 3/522 310/179 |
| 2007/0273221 A1* | 11/2007 | Kinoshita | H02K 3/50 310/58 |
| 2009/0127948 A1* | 5/2009 | Shimizu | H02K 3/50 310/71 |
| 2009/0256438 A1* | 10/2009 | Ikeda | H02K 3/522 310/71 |
| 2010/0327678 A1 | 12/2010 | Yamasaki et al. | |
| 2012/0229005 A1 | 9/2012 | Tominaga et al. | |
| 2012/0319512 A1* | 12/2012 | Nakagawa | H02K 1/278 310/71 |
| 2014/0009041 A1* | 1/2014 | Kawasaki | H02K 5/161 310/425 |
| 2014/0125173 A1 | 5/2014 | Hayashi | |
| 2015/0008803 A1 | 1/2015 | Furukawa et al. | |
| 2015/0188376 A1* | 7/2015 | Yamaguchi | H02K 3/522 310/71 |
| 2015/0188377 A1* | 7/2015 | Kim | H02K 1/278 310/156.38 |
| 2015/0357878 A1 | 12/2015 | Fukunaga et al. | |
| 2016/0276895 A1* | 9/2016 | Aizawa | H02K 3/522 |
| 2018/0183290 A1* | 6/2018 | Wust | H02K 3/522 |
| 2018/0316239 A1* | 11/2018 | Ogawa | H02K 11/30 |

FOREIGN PATENT DOCUMENTS

| | | | |
|---|---|---|---|
| KR | 1998-013882 A | 5/1998 | |
| WO | WO-2014112301 A1 * | 7/2014 | ............... H02K 3/28 |

OTHER PUBLICATIONS

Ogawa et al. "Motor", U.S. Appl. No. 15/750,858, filed Feb. 7, 2018.

* cited by examiner

MOTOR

BACKGROUND OF THE INVENTION

1. Field of the Invention

The present disclosure relates to a motor.

2. Description of the Related Art

In a motor in the related art, a coil lead wire is drawn out from a stator. The coil lead wire has a motor connected to a control device, a bus bar unit (for example, refer to Japanese Unexamined Patent Application Publication No. 2011-010409 and Japanese Unexamined Patent Application Publication No. 2011-200022). Examples of coils of the stator include a power supply coil and a neutral point coil depending on the winding method. The power supply coil is connected to an external control device. The neutral point coil is connected to another neutral point coil. In such a connection structure, the coil lead wire needs to be drawn to a connection destination while ensuring electrical insulation from a peripheral member.

SUMMARY OF THE INVENTION

According to an aspect of the present disclosure, a motor includes a rotor that has a shaft with a central axis extending in a vertical direction as a center, a stator disposed so as to face the rotor in a radial direction, a bearing that supports the shaft, a wire support member disposed above the stator, a bearing holder disposed above the wire support member to hold the bearing, and a bus bar unit disposed above the wire support member, in which the stator includes a plurality of teeth, and a plurality of coils provided on the plurality of teeth, the wire support member includes a wire holding portion that holds one portion of coil lead wires among the coil lead wires extending upward from the coil, a first conducting member that electrically connects the other portion of the coil lead wires to each other, and a main body portion that supports the wire holding portion and the first conducting member, the bus bar unit includes a second conducting member connected to the coil lead wire held by the wire holding portion, and a bus bar holder that holds the second conducting member, and the bearing holder includes a through-hole which penetrates the bearing holder in an axial direction and through which a coil end of the coil lead wire or the second conducting member passes.

The above and other elements, features, steps, characteristics and advantages of the present discloser will become more apparent from the following detailed description of the preferred embodiments with reference to the attached drawings.

DETAILED DESCRIPTION OF THE PREFERRED EMBODIMENTS

Hereinafter, embodiments of the invention will be described with reference to the drawings.

In the following description, the direction where a central axis J extends is a vertical direction. However, the vertical direction in this specification is simply a name used for description, and does not limit an actual positional relationship, a direction. In addition, unless otherwise noted, a direction parallel to the central axis J is simply referred to as "axial direction", a radial direction with the central axis J as a center is simply referred to as "radial direction", and a circumferential direction with the central axis J as a center (around axis of the central axis J) is simply referred to as "circumferential direction".

In the present specification, the fact of extending in the axial direction includes not only a case of strictly extending in the axial direction, but also a case of extending in a direction inclined in the range of less than 45° with respect to the axial direction. In addition, in the present specification, the fact of extending in the radial direction includes not only a case of strictly extending in the radial direction, that is, in the direction perpendicular to the axial direction, but also a case of extending in a direction inclined in the range of less than 45° with respect to the radial direction.

Figure 1:
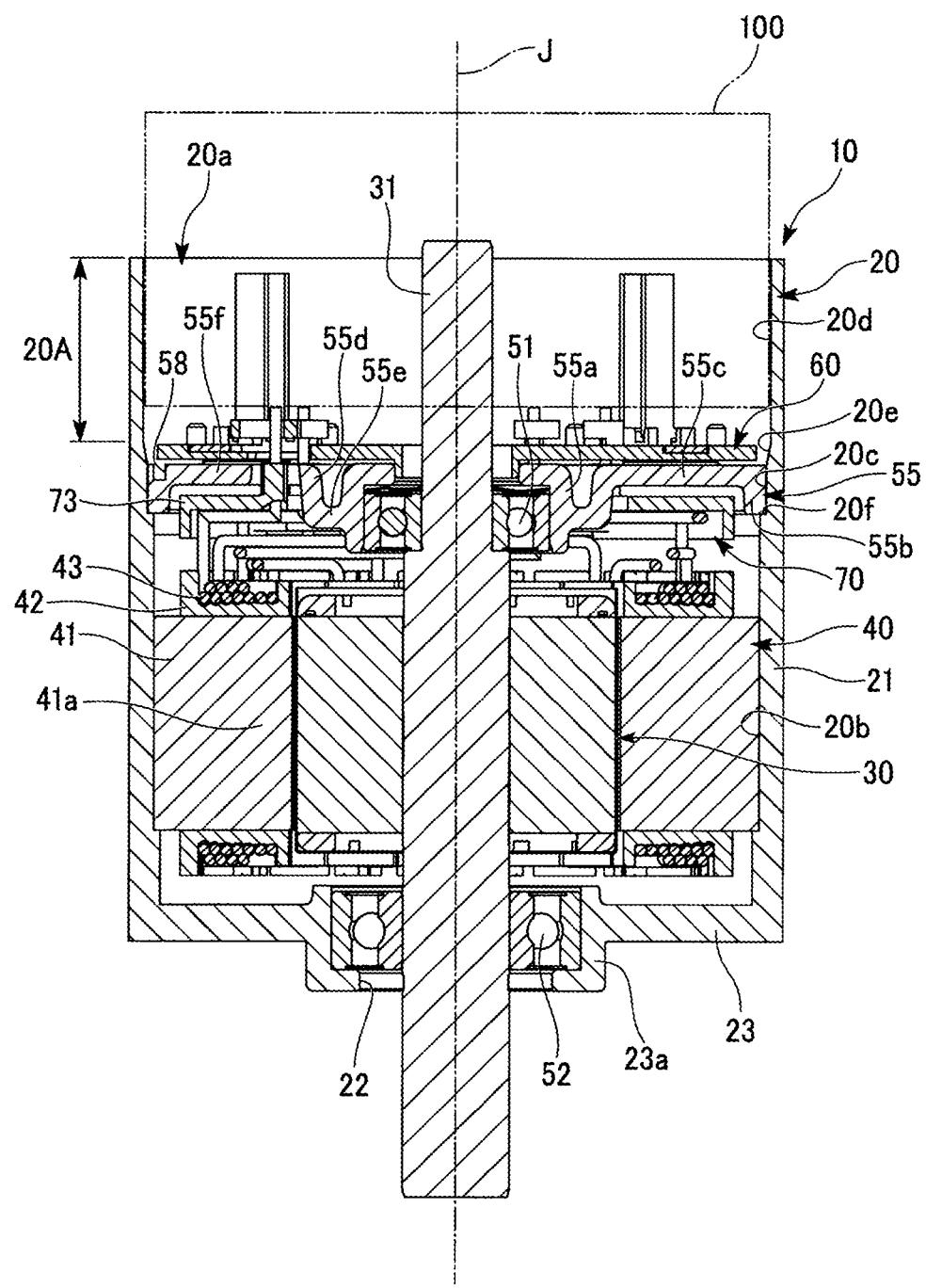
FIG. 1 is a cross-sectional view illustrating a motor according to the preferred embodiment.
Figure 2:
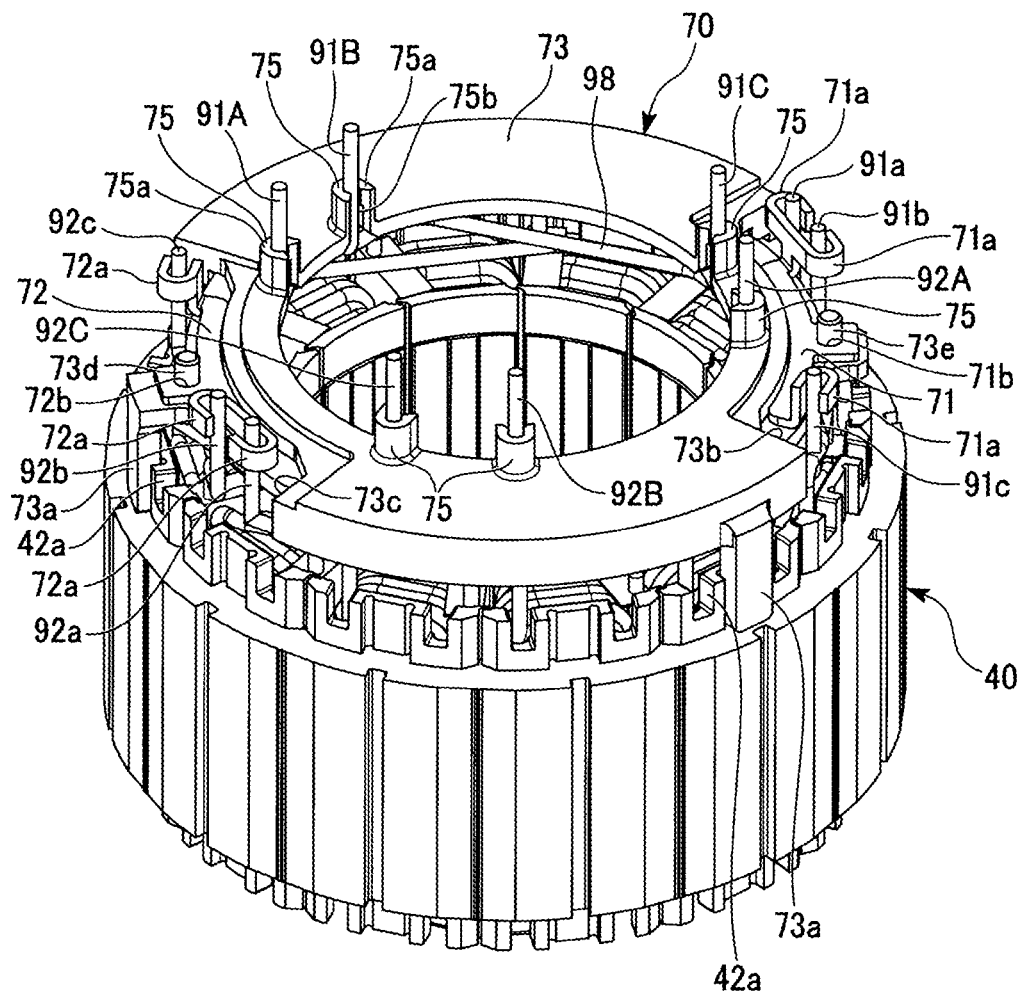
FIG. 2 is a perspective view illustrating a wire support member and a stator in the motor of FIG. 1.
Figure 3:
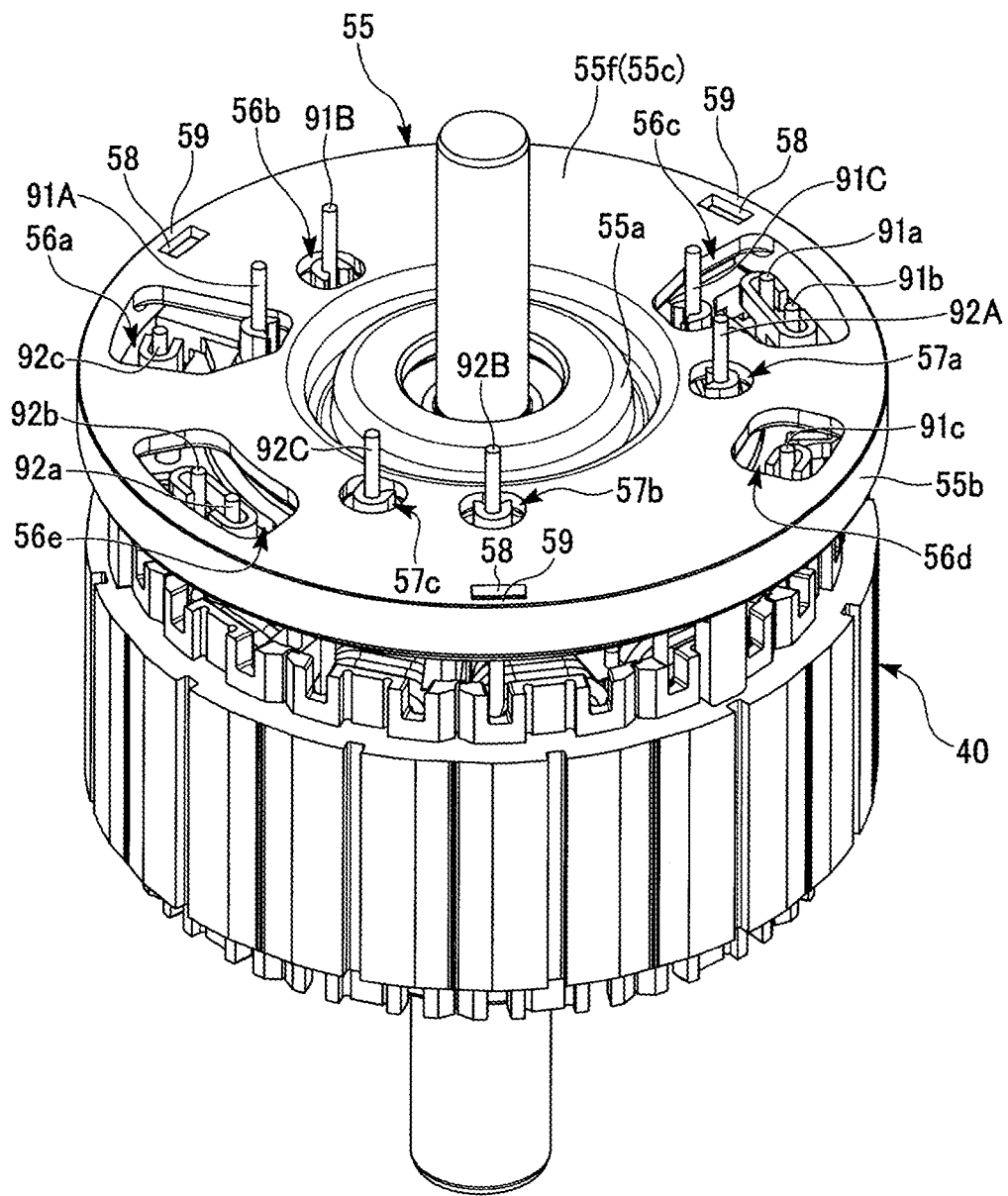
FIG. 3 is a perspective view illustrating a bearing holder and a stator unit in the motor of FIG. 1.
Figure 4:
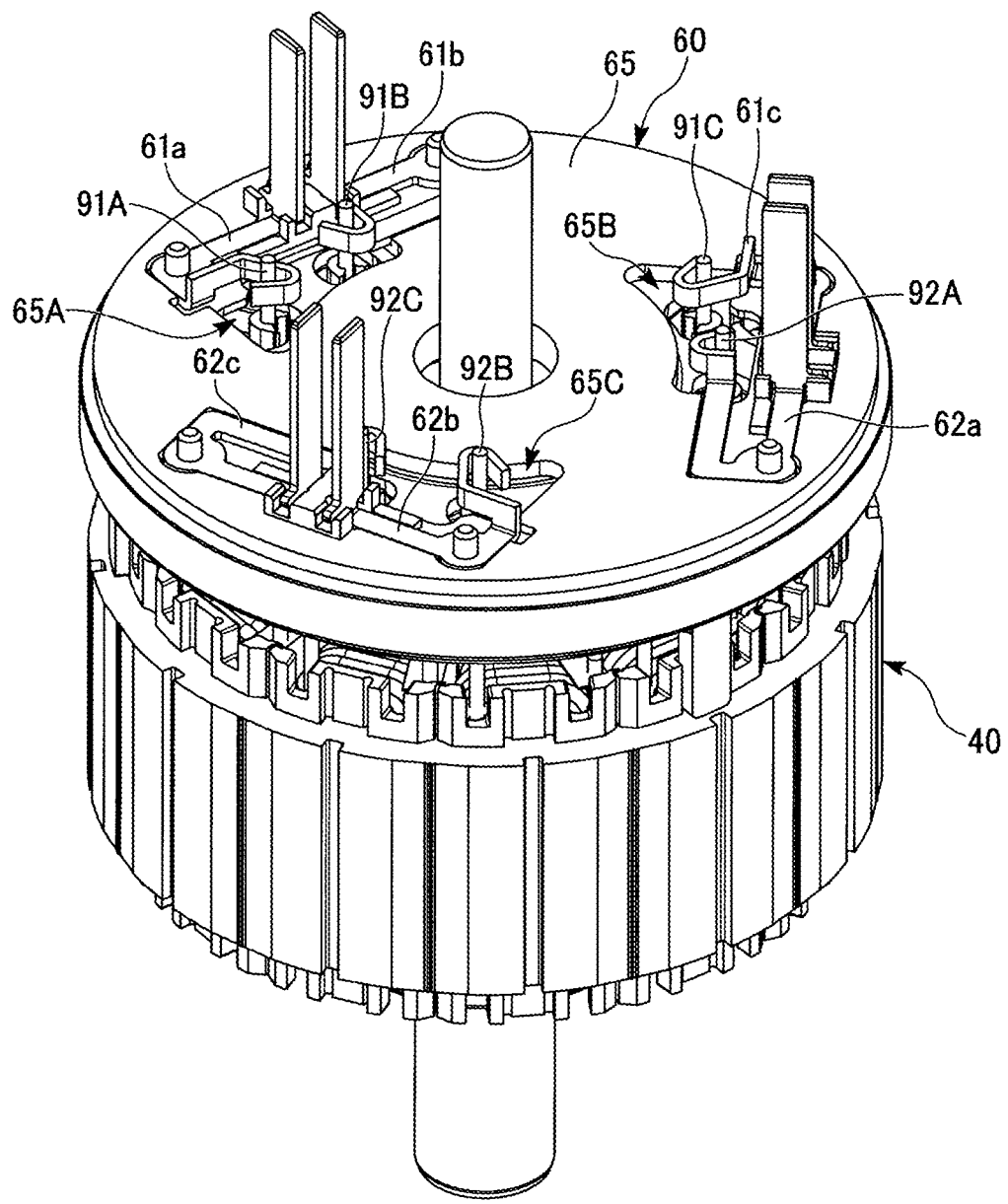
FIG. 4 is a perspective view illustrating a bus bar unit and the stator unit in the motor of FIG. 1.

FIG. 1 is a cross-sectional view illustrating a motor 10 according to the preferred embodiment. FIG. 2 is a perspective view illustrating a wire support member and a stator. FIG. 3 is a perspective view illustrating a bearing holder and a stator unit. FIG. 4 is a perspective view illustrating a bus bar unit and the stator unit.

The motor 10 is provided with a housing 20, a rotor 30, a stator 40, a wire support member 70, a bearing holder 55, an upper bearing 51, a lower bearing 52, and a bus bar unit 60. In the motor 10, the bus bar unit 60, the bearing holder 55, the wire support member 70, and the stator 40 are disposed in this order downward from an upper side. The motor 10 has a control device accommodating region 20A capable of accommodating at least a portion of a control device 100 above the bus bar unit 60. In the preferred embodiment, the motor 10 is a three-phase motor having U-phase, V-phase, and W-phase.

The housing 20 has a cylindrical portion 21 extending in the vertical direction, a bottom wall portion 23 positioned at the lower end of the cylindrical portion 21, and an opening portion 20a opening upward. To the inner surface of the housing 20, the stator 40 and the bearing holder 55 are fixed in order from the lower side.

The cylindrical portion 21 has a cylindrical shape with the central axis J as a center. The cylindrical portion 21 has an inner peripheral surface 20b that holds the stator 40, an inner peripheral surface 20c that holds the bearing holder 55, and an inner peripheral surface 20d of the control device accommodating region 20A that accommodates a portion of the control device 100. The inner diameter of the inner peripheral surface 20d is larger than the inner diameter of the inner peripheral surface 20c. The inner diameter of the inner peripheral surface 20c is larger than the inner diameter of the inner peripheral surface 20b. That is, the housing 20 has an inner surface shape in which the inner diameter decreases rearward from the opening portion 20a (bottom wall portion 23 side).

The inner diameter of the inner peripheral surface 20c is different from the inner diameter of the inner peripheral surface 20d. The housing 20 has an inclined surface 20e that connects the inner peripheral surface 20c and the inner peripheral surface 20d to each other. In the surface shape of the inclined surface 20e, the inner diameter decreases downward in the axial direction. That is, the distance in the radial direction between the central axis J and the inclined surface 20e gradually decreases downward in the axial direction. The cross-sectional shape of the inclined surface 20e is preferably linear or curved. As a result, an assembling operator or the like (such as an operator and an assembling device) can smoothly dispose the bearing holder 55 inserted from the opening portion 20a to an attachment position (inner peripheral surface 20c).

The housing 20 may not necessarily have the inclined surface 20e. For example, the housing 20 may be configured such that the inner peripheral surface 20c and the inner peripheral surface 20d are connected to each other in the axial direction via a step portion.

The housing 20 has a shelf surface 20f. The shelf surface 20f is disposed between the inner peripheral surface 20b and the inner peripheral surface 20c and extends in the circumferential direction so as to face the opening portion 20a. The shelf surface 20f is a receiving surface that supports the bearing holder 55 in the axial direction. With this configuration, the housing 20 can hold the bearing holder 55 at a predetermined position with high accuracy in the axial direction.

The shape of the cylindrical portion 21 is not limited to the cylindrical shape. When the inner peripheral surface of the cylindrical portion 21 has a shape capable of holding the stator 40 and the bearing holder 55, the outer shape of the cylindrical portion 21 may be a box shape, for example. In addition, the outer shape of the cylindrical portion 21 may be a combination of a cylindrical shape and a box shape. In the cylindrical portion 21, the stator 40 or the bearing holder 55 may be held by a portion of the inner surface in the circumferential direction.

The bottom wall portion 23 is disposed below the stator 40. The bottom wall portion 23 has a bearing holding portion 23a and an output shaft hole 22. The bearing holding portion 23a holds the lower bearing 52. The output shaft hole 22 penetrates the bottom wall portion 23 in the axial direction.

The rotor 30 has a shaft 31. The shaft 31 is centered on the central axis J extending in the vertical direction. The rotor 30 rotates in the circumferential direction about the central axis J together with the shaft 31 as a center. The end portion below the shaft 31 protrudes downward the housing 20 via the output shaft hole 22.

The upper bearing 51 and the lower bearing 52 support the shaft 31 so as to be rotatable around the central axis. The bearing holding portion 23a holds the lower bearing 52 below the stator 40. The bearing holder 55 holds the upper bearing 51 above the stator 40.

The stator 40 is positioned outward the rotor 30 in the radial direction. The stator 40 has a stator core 41, an insulator 42, and a plurality of coils 43. The stator core 41 has an annular shape with the central axis J as a center. The stator core 41 has a plurality of teeth 41a. The insulator 42 is attached to the teeth 41a. The coil 43 is configured to include a conductor wound around the insulator 42. The coil 43 is disposed on each of the teeth 41a. The outer peripheral surface of the stator 40 is fixed to the inner peripheral surface 20b of the housing 20.

As illustrated in FIGS. 1 and 2, the wire support member includes a first conducting member 71, a second conducting member 72, a plurality of wire holding portions 75, and a main body portion 73. In the preferred embodiment, the number of wire holding portions is six. The wire support member 70 is disposed on the stator 40. A neutral point of the coil is connected to the first conducting members 71 and 72. In the following description, the first conducting member 71 is referred to as a first neutral point bus bar 71, and the second conducting member 72 is referred to as a second neutral point bus bar 72.

The main body portion 73 is annular and disposed above the stator 40. The main body portion 73 has a plurality of leg portions 73a extending downward in the axial direction. By fitting the leg portion 73a into a mounting groove 42a of the insulator 42, the wire support member 70 is supported on the stator 40. The main body portion 73 is formed of an insulating material such as resin.

The wire holding portion 75 is disposed on the inner peripheral edge of the main body portion 73. The wire holding portion 75 has a support wall portion 75a and a recessed portion 75b. The support wall portion 75a protrudes upward from the main body portion 73. The recessed portion 75b opens inward the support wall portion 75a in the radial direction. Two of the six wire holding portions 75 are disposed in three positions at every 120° in the circumferential direction. The wire holding portion 75 can be disposed on the outer peripheral edge of the main body portion 73. The arrangement and the number of the wire holding portions 75 can be appropriately changed in consideration of the number of coil lead wires to be described later, a lead out position of the coil lead wire, and the like.

The main body portion 73 has cutout portions 73b and 73c having a fan-shaped outer shape in plan view. The cutout portions 73b and 73c are disposed at two positions on the outer peripheral portion of the main body portion 73. Each of the first neutral point bus bar 71 and the second neutral point bus bar 72 has three U-shaped connection terminals 71a and 72a and one through-hole 71b and 72b. The first neutral point bus bar 71 and the second neutral point bus bar 72 are disposed on the outer peripheral side of the main body portion 73 from the wire holding portion 75. When viewed from the axial direction, the first neutral point bus bar 71 and the second neutral point bus bar 72 are exposed from the cutout portions 73b and 73c. The main body portion 73 has protrusion portions 73d and 73e protruding in the axial direction. The protrusion portions 73d and 73e are disposed on the outer peripheral side of the main body portion 73. The positions in the circumferential direction of the protrusion portions 73d and 73e are the same as the positions in the circumferential direction of the cutout portions 73b and 73c. The protrusion portions 73d and 73e are fitted into the through-holes 71*b* and 72*b* of the first neutral point bus bar 71 and the second neutral point bus bar 72 and thereafter heated and melted and solidified. As a result, the first neutral point bus bar 71 and the second neutral point bus bar 72 are fixed to the main body portion 73. The first neutral point bus bar 71 and the second neutral point bus bar 72 may be disposed on the inner peripheral portion of the main body portion 73 together with the cutout portions 73*b* and 73*c*.

The stator 40 has twelve coil lead wires 91A to 91C, 91*a* to 91*c*, 92A to 92C, and 92*a* to 92*c* extending from the plurality of coils 43. The coil lead wires 91A to 91C, 92A to 92C are drawn out above the stator 40 and bent upward in the axial direction from the recessed portion 75*b* of the wire holding portion 75 as a starting point, and are held by the wire holding portion 75. The width in the circumferential direction of the opening portion inward the recessed portion 75*b* in the radial direction is smaller than the wire diameter of the coil 43. The inner diameter of the portion outward the recessed portion 75*b* in the radial direction is substantially the same as the wire diameter of the coil 43. Therefore, when the coil lead wires 91A to 91C and 92A to 92C are pushed rearward from the opening portion of the recessed portion 75*b*, the opening portion expands due to elastic deformation, and the opening portion returns to the original position after the coil lead wires 91A to 91C and 92A to 92C are accommodated in the recessed portion 75*b*. In this manner, the coil 43 is held by the wire holding portion 75. The coil lead wires 91A to 91C and 92A to 92C held by the wire holding portion 75 protrude upward in the axial direction from the recessed portion 75*b*. The coil 43 has certain rigidity. Therefore, the coil lead wires 91A to 91C, 92A to 92C protruding from the wire holding portion 75 do not collapse or deviate greatly.

The coil lead wires 91*a* to 91*c* are connected to the connection terminal 71*a* of the first neutral point bus bar 71. The coil lead wires 92*a* to 92*c* are connected to the connection terminal 72*a* of the second neutral point bus bar 72.

The coil lead wires 91A to 91C are wirings for power supply of each phase (U phase, V phase, and W phase). The coil lead wires 91*a* to 91*c* are wirings for neutral point connection corresponding to the coil lead wires 91A to 91C. The coil lead wires 92A to 92C are wirings for power supply of each phase. The coil lead wires 92*a* to 92*c* are wirings for neutral point connection corresponding to the coil lead wires 92A to 92C.

An insulating tube 98 as an insulating member is attached to the coil lead wire drawn out from the coil 43. The insulating tube 98 electrically insulates the coil lead wires 91A to 91C, 91*a* to 91*c*, 92A to 92C, 92*a* to 92*c* extending along the lower surface of the wire support member 70, the coil lead wires 91A to 91C, 91*a* to 91*c*, 92A to 92C, 92*a* to 92*c*, and the coil 43. The coil lead wire drawn out from the coil 43 may be electrically insulated by an insulating member or the like other than the insulating tube 98.

The bearing holder 55 has a substantially disk shape and is disposed above the stator 40. The bearing holder 55 holds the upper bearing 51. The bearing holder 55 is held on the inner peripheral surface 20*c* of the housing 20 by interference fitting. In the preferred embodiment, the bearing holder 55 is fixed to the inner peripheral surface 20*b* by shrink fitting. The shrink fitting is a fitting method included in the interference fitting. The bearing holder 55 may be fixed to the inner peripheral surface 20*b* of the housing 20 by other methods such as press fitting.

As a result, without using a fixing member such as a C ring, the bearing holder 55 can be fixed to the housing 20, and the number of parts of the motor 10 can be reduced. In a case where the bearing holder 55 is fixed to the housing 20 using the C ring, it is necessary to provide a groove that holds the C ring on the inner peripheral surface 20*b* of the housing 20. However, according to the above configuration, it is not necessary to provide the groove, so that the thickness of the housing 20 can be reduced. As a result, it is possible to reduce the outer diameter of the housing 20 while maintaining the inner diameter necessary in order to hold the stator 40 and the bearing holder 55 and the like. Therefore, it is possible to reduce the size of the motor 10.

As illustrated in FIGS. 1 and 3, the bearing holder 55 has an inner cylindrical portion 55*a*, an outer cylindrical portion 55*b*, and a connecting portion 55*c*. The inner cylindrical portion 55*a* holds the upper bearing 51. The outer cylindrical portion 55*b* is fitted to the inner peripheral surface 20*b* of the housing 20. The connecting portion 55*c* connects the inner cylindrical portion 55*a* and the outer cylindrical portion 55*b* to each other.

The connecting portion 55*c* has an intermediate cylindrical portion 55*d*, an inner connecting portion 55*e*, and an outer connecting portion 55*f*. The intermediate cylindrical portion 55*d* has a cylindrical shape and is positioned between the inner cylindrical portion 55*a* and the outer cylindrical portion 55*b*. In plan view, the shape of the inner connecting portion 55*e* is annular. The inner connecting portion 55*e* connects the lower end of the intermediate cylindrical portion 55*d* and the outer peripheral surface of the inner cylindrical portion 55*a* to each other. In plan view, the shape of the outer connecting portion 55*f* is annular. The outer connecting portion 55*f* connects the upper end of the inner connecting portion 55*e* and the upper end of the outer cylindrical portion 55*b* to each other.

In FIG. 1, the end portion inside the connecting portion 55*c* in the radial direction is bent downward in the axial direction, extends inward in the radial direction, and is connected to the inner cylindrical portion 55*a*. A gap is formed between the inner cylindrical portion 55*a* and the connecting portion 55*c*. Therefore, the inner cylindrical portion 55*a* and the connecting portion 55*c* can be elastically deformed in the radial direction. Therefore, even in a case where the bearing holder 55 and the housing 20 are expanded and contracted due to the temperature change at the time of assembling the motor 10 or the use of the motor 10, and an excessive pressing force acts on the fitting portion between the bearing holder 55 and the housing 20 or the upper bearing 51, the pressing force is absorbed by the elastic deformation of the inner cylindrical portion 55*a* and the connecting portion 55*c*. Therefore, a decrease in fixing strength between the bearing holder 55 and the housing 20 can be suppressed, and the upper bearing 51 can rotatably and smoothly support the shaft 31.

The bearing holder 55 has a plurality of through-holes 56*a* to 56*c* and 57*a* to 57*c* penetrating the bearing holder 55 in the axial direction. The plurality of through-holes 56*a* to 56*c* and 57*a* to 57*c* are disposed in the outer connecting portion 55*f*.

The coil lead wires 91A, 91B, and 91C pass through the corresponding through-holes 56*a*, 56*b*, and 56*c*, respectively, and extend upward the bearing holder 55. The coil lead wires 92A, 92B, and 92C pass through the corresponding through-holes 57*a*, 57*b*, and 57*c*, respectively, and extend upward the bearing holder 55. The inner diameter of the openings of the through-holes 56*a* and 56*c* is larger than the outer diameter of the wire holding portion 75. As a result, the connecting portions between the coil lead wires 91*a*, 91*b*, and 92*c* for the neutral point connection and the connection terminals 71*a* and 72*a* can maintain electrical insulation from the bearing holder 55. The configuration of the through-holes 56*d*, 56*e* disposed in the bearing holder 55 is the same as that of the through-holes 56*a* and 56*c*, so that the description thereof will be omitted.

The bearing holder 55 is preferably formed of a metal material. The bearing holder 55 has three recessed portions 58 on the upper surface of the outer edge portion of the bearing holder 55. The recessed portion 58 is provided on the upper surface of the bearing holder 55 by press processing (for example, caulking processing) with a pin or the like. When the press processing is performed on the bearing holder 55, the pressurized portion on the upper surface of the bearing holder 55 plastically deforms to form the recessed portion 58 and a pressing portion 59 protruding outward in the radial direction from the outer surface of the bearing holder 55 is formed. When the bearing holder 55 is disposed in the housing 20, the inner peripheral surface 20*c* of the housing 20 can be locally pressed by the pressing portion 59. The bearing holder 55 is fixed to the inner peripheral surface 20*c* by shrink fitting and caulking.

The pressing portion 59 is disposed on the portion tightly fitted to the housing 20 of the bearing holder 55, so that the pressing force between the housing 20 and the bearing holder 55 locally increases and the fastening strength of both members can be further enhanced.

At least one of the recessed portions 58 is disposed in the vicinity of the through-holes 56*a* to 56*c*. In the preferred embodiment, as illustrated in FIG. 3, the recessed portion 58 is disposed in the vicinity of the through-hole 56*a* and in the vicinity of the through-hole 56*b*. The distance between the through-holes 56*a* and 56*b* and the adjacent recessed portion 58 is within 15° in the circumferential direction with respect to the central axis J as a reference. The recessed portion 58 is formed by plastic deformation. Therefore, the strength of the member at the position where the recessed portion 58 is formed is improved. The strength of the bearing holder 55 is likely to decrease in the vicinity of the through-holes 56*a* to 56*c*. However, since the recessed portion 58 is disposed in the vicinity of the through-holes 56*a* to 56*c*, the strength in the vicinity of the through-holes 56*a* to 56*c* can be ensured.

The linear expansion coefficient of the material constituting the bearing holder 55 is equal to the linear expansion coefficient of the material constituting the housing 20. With this configuration, the expansion amount and the contraction amount of the housing 20 and the bearing holder 55 are the same as each other with respect to the temperature change after the bearing holder 55 is attached to the housing 20. Therefore, the attachment of the bearing holder 55 to the housing 20 is less likely to slack. In the case of the preferred embodiment, for example, the material of the bearing holder 55 is aluminum or an aluminum alloy. The material of the housing 20 is formed of aluminum or an aluminum alloy. The material of the bearing holder 55 and the housing 20 may be other kinds of materials.

The bus bar unit 60 has phase bus bars 61*a* to 61*c* and 62*a* to 62*c*, and a bus bar holder 65. The bus bar holder 65 holds the phase bus bars 61*a* to 61*c* and 62*a* to 62*c*. The bus bar holder 65 has three through-holes 65A, 65B, and 65C penetrating the bus bar holder 65 in the axial direction.

The bus bar holder 65 is fixed to the upper surface of the bearing holder 55. The coil lead wires 91A to 91C and 92A to 92C extending upward from the through-holes 56*a* to 56*c* and 57*a* to 57*c* of the bearing holder 55 extend upward the bus bar holder 65 through the through-holes 65A to 65C of the bus bar holder 65. The coil lead wires 91A to 91C and 92A to 92C are connected to the phase bus bars 61*a* to 61*c* and 62*a* to 62*c* on the upper surface of the bus bar holder 65, respectively.

The phase bus bars 61*a* to 61*c* and 62*a* to 62*c* function as connection terminals with the control device 100. The bus bar unit 60 is fixed to the upper surface of the bearing holder 55 fixed to the housing 20. Therefore, the phase bus bars 61*a* to 61*c* and 62*a* to 62*c* are positioned with high accuracy in the axial direction within the control device accommodating region 20A. With this configuration, the motor 10 and the control device 100 can be easily connected to each other.

In the preferred embodiment, the motor 10 has the wire support member 70 therefore. While ensuring electrical insulation from the peripheral member, the coil lead wire can be drawn to the connection destination.

As described above, the coil 43 of the stator 40 of the motor 10 has the coil lead wires 91A to 91C and 92A to 92C for power supply of each phase and the coil lead wires 91*a* to 91*c* and 92*a* to 92*c* for neutral point connection by a predetermined winding method. The coil lead wires 91A to 91C and 92A to 92C for the power supply of each phase are connected to the bus bar unit 60 disposed above the bearing holder 55. The coil lead wires 91*a* to 91*c* and 92*a* to 92*c* for the neutral point connection are connected to each other.

The wire support member 70 can position the coil lead wires 91A to 91C and 92A to 92C drawn out above the stator 40 at a specific position and support the coil lead wires along the axial direction by the wire holding portion 75. That is, the coil lead wires 91A to 91C and 92A to 92C can be accurately positioned and drawn out to the phase bus bars 61*a* to 61*c* and 62*a* to 62*c* of the bus bar unit 60 serving as the connection destination by the wire support member 70.

Furthermore, in the preferred embodiment, the support wall portion 75*a* of the wire holding portion 75 extends to inside the through-holes 56*a* to 56*c* and 57*a* to 57*c* of the bearing holder 55. As a result, in the motor 10, the coil lead wires 91A to 91C and 92A to 92C can be drawn out above the bearing holder 55 while being electrically insulated from the bearing holder 55.

Therefore, when the bearing holder 55 is disposed in the assembly in which the stator 40 and the wire support member 70 are combined, the coil lead wires 91A to 91C and 92A to 92C for power supply of each phase can be easily drawn out via the through-holes 56*a* to 56*c* and 57*a* to 57*c* of the bearing holder 55. The coil lead wires 91A to 91C and 92A to 92C are accurately positioned. Therefore, in a case where the bus bar unit 60 is disposed at a predetermined position of the bearing holder 55, since each coil lead wire 91A to 91C and 92A to 92C is accurately positioned, the bus bar unit 60 can be easily connected to the phase bus bars 61*a* to 61*c* and 62*a* to 62*c*.

In addition, in the wire support member 70, when coil lead wire can be positioned at a specific position and held along the axial direction, the wire holding portion 75 may not be protruded from the main body portion 73. For example, a V-shaped cutout, a hole or the like is provided in the vicinity of the inner peripheral edge of the main body portion 73 and the coil lead wire may be held by the cutout, the hole or the like. With this configuration, the coil lead wire can be held with high accuracy. Therefore, when the held coil lead wire is passed through the through-hole of the bearing holder 55, if the hole diameter of the through-hole is increased even if the wire holding portion is not disposed in the through-hole, it is difficult for the coil lead wire to come into contact with the inner peripheral surface of the through-hole, and electrical insulation between the coil lead wire and the bearing holder 55 can be ensured.

In the motor 10, the wire support member 70 holds the coil lead wires 91a to 91c and 92a to 92c via the first neutral point bus bar 71 and the second neutral point bus bar 72. As a result, the coil lead wires 91a to 91c and 92a to 92c for the neutral point connection are connected to each other at the wire support member 70 located above the stator 40. Therefore, the coil lead wires 91a to 91c and 92a to 92c can be disposed so as to be connected to each other without increasing the lead length of the coil. As a result, short-circuiting of the coil lead wires 91a to 91c and 92a to 92c can be suppressed.

In addition, the coil lead wires 91a to 91c and 92a to 92c for neutral point connection of the stator 40 are connected to the first neutral point bus bar 71 and the second neutral point bus bar 72 provided in the wire support member 70, so that the configuration of the bus bar unit 60 to which the coil lead wires 91A to 91C and 92A to 92C for power supply are connected can be simplified. The configuration of the bus bar unit 60 can be simplified. As a result, for example, it is possible to ensure a space for disposing the control device 100 in the housing 20 in preparation.

The coil lead wires 91a to 91c and 92a to 92c for neutral point connection may be connected to one place depending on the type of winding method in some cases. In this case, the number of neutral point bus bars can be one.

In the motor 10, the coil lead wires 91A to 91C, 92A to 92C, 91a to 91c, and 92a to 92c for power supply and neutral point connection are drawn out above the stator 40. That is, all the coil lead wires of the stator 40 are drawn out to the upper side of the stator 40. As a result, it is not necessary to provide a space for drawing the coil lead wire between the stator 40 and the bottom wall portion 23. Therefore, the stator 40 can be disposed close to the bottom wall portion 23. In the motor 10, since the ratio of the weight of the stator 40 to the total weight is large, it is possible to significantly shift the position of the center of gravity of the motor by changing the position of the stator 40 in the axial direction. As illustrated in FIG. 1, in a case where the motor 10 is attached to an external device in a state where the stator 40 is disposed on the lower side in the axial direction of the motor 10, the center of gravity of the motor 10 is positioned on the external device side. As a result, vibration generated from the motor 10 can be suppressed.

The coil lead wires 91A to 91C and 92A to 92C drawn out above the bearing holder 55 are connected to the phase bus bars 61a to 61c and 62a to 62c. The phase bus bars 61a to 61c and 62a to 62c are connected to the control device 100. Since the bus bar unit 60 is fixed to the upper surface of the bearing holder 55, the positional accuracy of the phase bus bars 61a to 61c and 62a to 62c in the axial direction is high as compared with the case where the bus bar unit 60 is fixed to the stator 40. Therefore, the bus bar unit 60 can be attached to a predetermined position more accurately, and good electrical connection between the bus bar unit 60 and the control device 100 can be achieved.

The present disclosure is not limited to the preferred embodiment described above and other preferred embodiments and modification examples as described later can be adopted. In the following description, the same configurations as those described above may be omitted by appropriately denoting the same reference numerals or the like in some cases.

Figure 5:
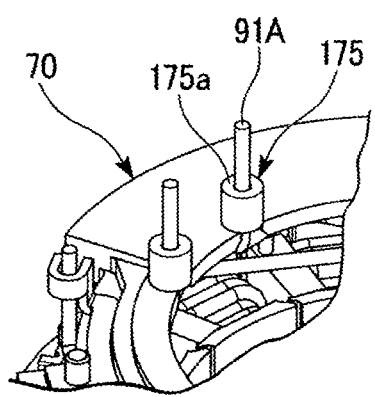
FIG. 5 is a partial perspective view illustrating another aspect of a wire holding portion in the motor of FIG. 1.

FIG. 5 is a partial perspective view illustrating another aspect of a wire holding portion.

As illustrated in FIG. 5, the wire holding portion 175 has a cylindrical support wall portion 175a. The support wall portion 175a has a through-hole penetrating in the axial direction. The coil lead wire 91A extending from the stator 40 is drawn out above the wire support member 70 through the through-hole of the support wall portion 175a.

In the wire holding portion 75 illustrated in FIG. 2, the recessed portion 75b opens inward in the radial direction. Therefore, the coil lead wires 91A to 91C and 92A to 92C can be easily fitted into the recessed portion 75b, and work such as positioning can be performed. On the other hand, in the cylindrical wire holding portion 175 illustrated in FIG. 5, the entire circumference of the coil lead wire is held by the support wall portion 175a. Therefore, it is possible to prevent the coil lead wires 91A to 91C and 92A to 92C from being inclined or being disengaged from the support wall portion 175a, and it is possible to enhance the insulation between the coil lead wires 91A to 91C and 92A to 92C and other members.

Figure 6:
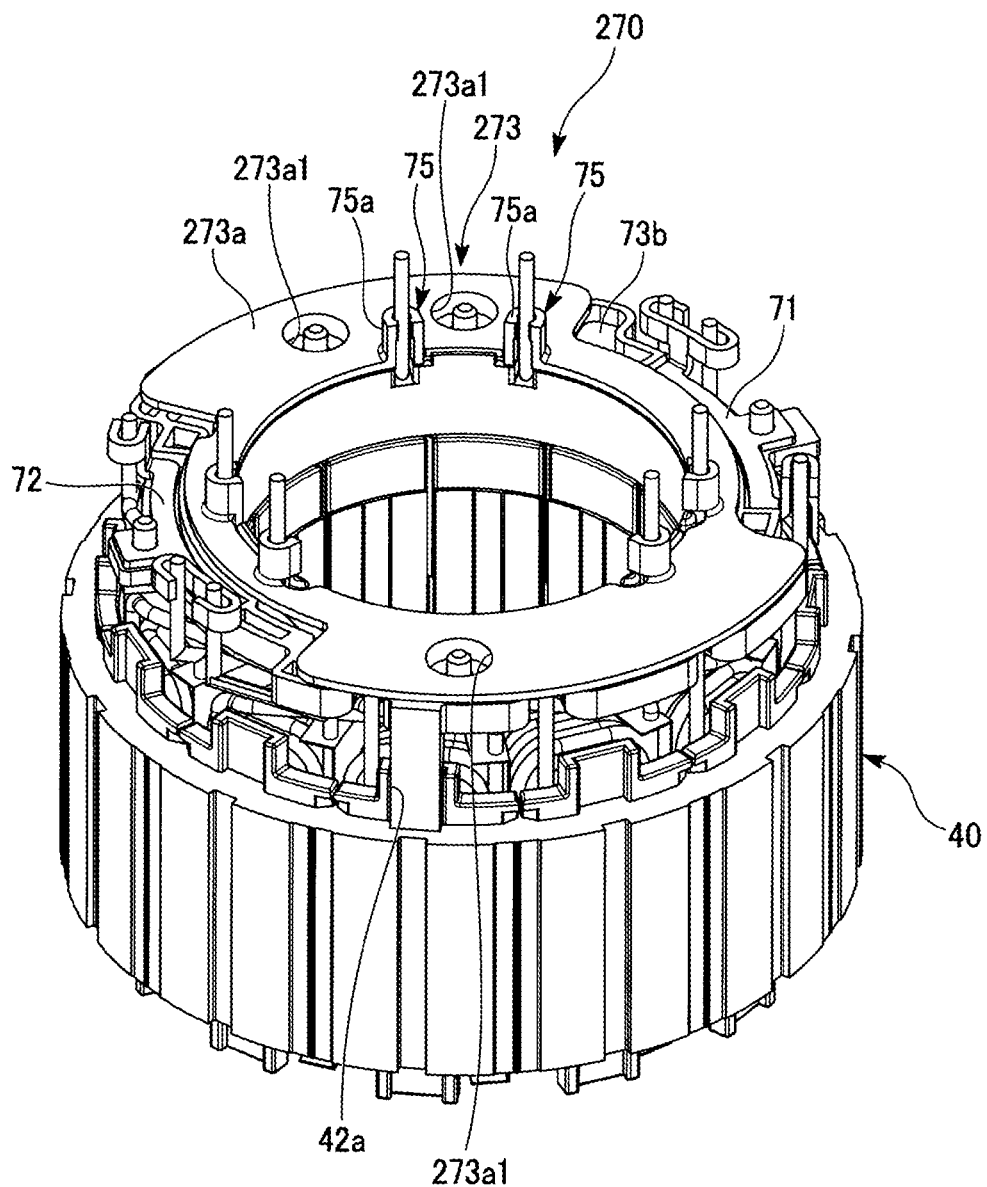
FIG. 6 is a perspective view illustrating a wire support member according to Modification Example 1 in the motor of FIG. 1.
Figure 7:
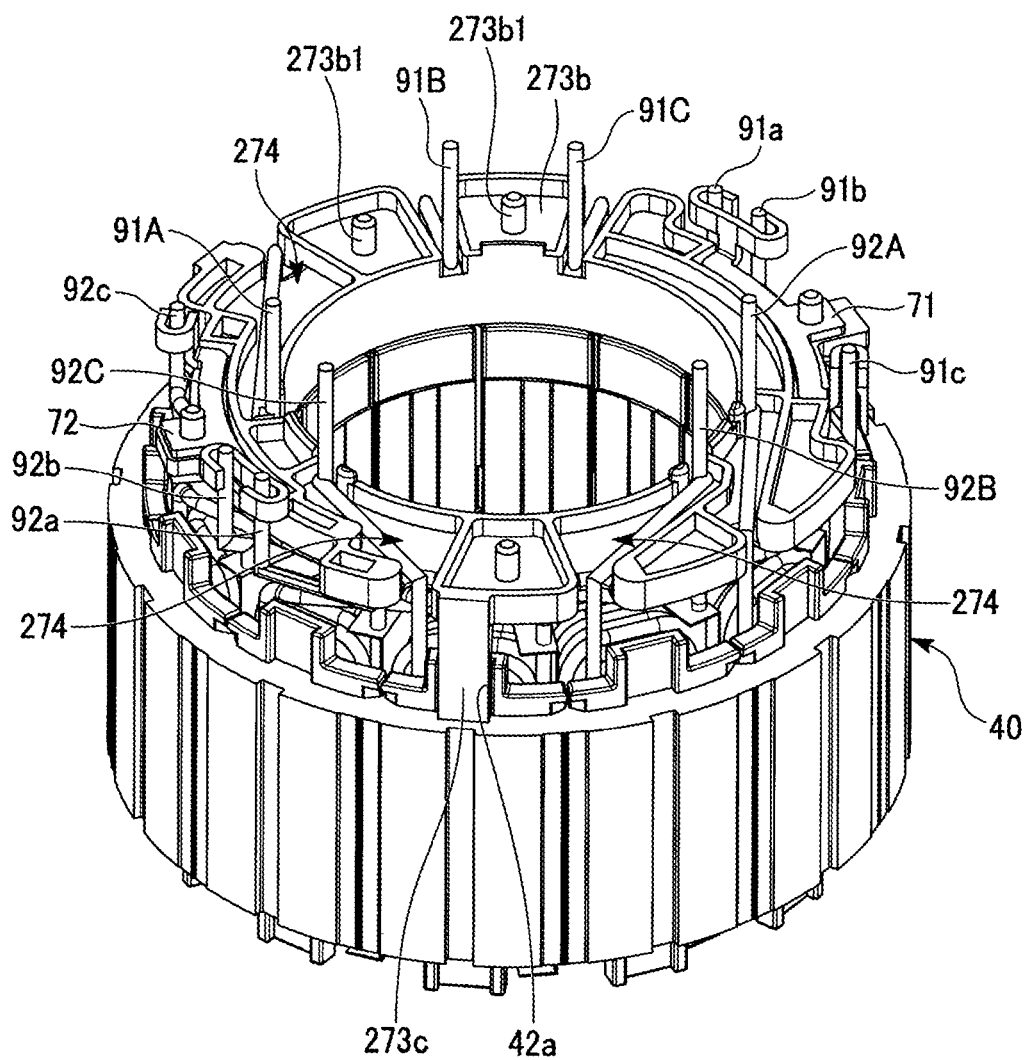
FIG. 7 is a perspective view illustrating a state where an upper support member of the wire support member of FIG. 6 is removed.

FIG. 6 is a perspective view illustrating a wire support member 270 according to Modification Example 1 of the preferred embodiment. FIG. 7 is a perspective view illustrating a state where an upper support member of the wire support member 270 of FIG. 6 is removed.

In FIGS. 6 and 7, instead of the wire support member 70 illustrated in FIG. 1 or 2, the wire support member 270 illustrated in FIG. 6 is attached to the motor 10. The wire support member 270 has a plurality of wire holding portions 75, a first neutral point bus bar 71, a second neutral point bus bar 72, and a main body portion 273. In FIG. 6, the number of the wire holding portions 75 is six. The main body portion 273 has an upper support member 273a illustrated in FIG. 6 and a lower support member 273b illustrated in FIG. 7.

The upper support member 273a and the lower support member 273b are insulating members and are substantially annular in plan view. The six wire holding portions 75 are disposed on the inner peripheral edge of the upper support member 273a. The first neutral point bus bar 71 and the second neutral point bus bar 72 are attached to the outer peripheral portion of the lower support member 273b. The lower support member 273b has a plurality of leg portions 273c. In FIGS. 6 and 7, the number of the leg portions 273c is three. The leg portion 273c extends downward in the axial direction from the outer edge end of the lower support member 273b. The leg portion 273c is supported by the mounting groove 42a of the insulator 42. The outer shape of the upper support member 273a and the outer shape of the lower support member 273b in plan view are not limited to the annular shape, and may be, for example, an elliptical shape, an arc shape, or the like.

The coil lead wires 91A to 91C and 92A to 92C extending from the stator 40 are wound around from the outer peripheral side to the upper surface of the lower support member 273b and are accommodated in the recessed portion 274 on the upper surface of the lower support member 273b. The coil lead wires 91A to 91C and 92A to 92C are bent upward in the axial direction on the inner peripheral edge of the lower support member 273b. The upper support member 273a is attached to the upper surface of the lower support member 273b. The upper support member 273a covers a portion of the coil lead wires 91A to 91C and 92A to 92C disposed in the recessed portion 274. The coil lead wires 91A to 91C and 92A to 92C pass between the upper support member 273a and the lower support member 273b and extend to the wire holding portion 75 of the upper support member 273a. The coil lead wires 91A to 91C and 92A to 92C are held by the wire holding portion 75.

In the above configuration, the upper support member 273a and the lower support member 273b interpose the coil lead wire. The lower support member 273b is disposed between the coil lead wires 91A to 91C and 92A to 92C and the stator 40, so that it is possible to insulate the stator 40 from the coil lead wires 91A to 91C and 92A to 92C. The upper support member 273a is disposed between the coil lead wires 91A to 91C and 92A to 92C and the bearing holder 55, so that it is possible to ensure insulation between the coil lead wire and the bearing holder 55. That is, in the above configuration, it is not necessary to provide the insulating tube 98 of the coil lead wire illustrated in FIG. 1.

The upper support member 273a has a through-hole 273a1 penetrating in the axial direction. The lower support member 273b has a protrusion portion 273b1 extending in the axial direction. The protrusion portion 273b1 is inserted into the through-hole 273a1 and the protrusion portion 273b1 melts and solidifies by heating or the like. As a result, the upper support member 273a is fixed to the lower support member 273b.

The upper support member 273a can be fixed to the lower support member 273b by press fitting, adhesion, snap fitting, or the like. The wire holding portion 75 may be provided not in the upper support member 273a but in the lower support member 273b.

Figure 8:
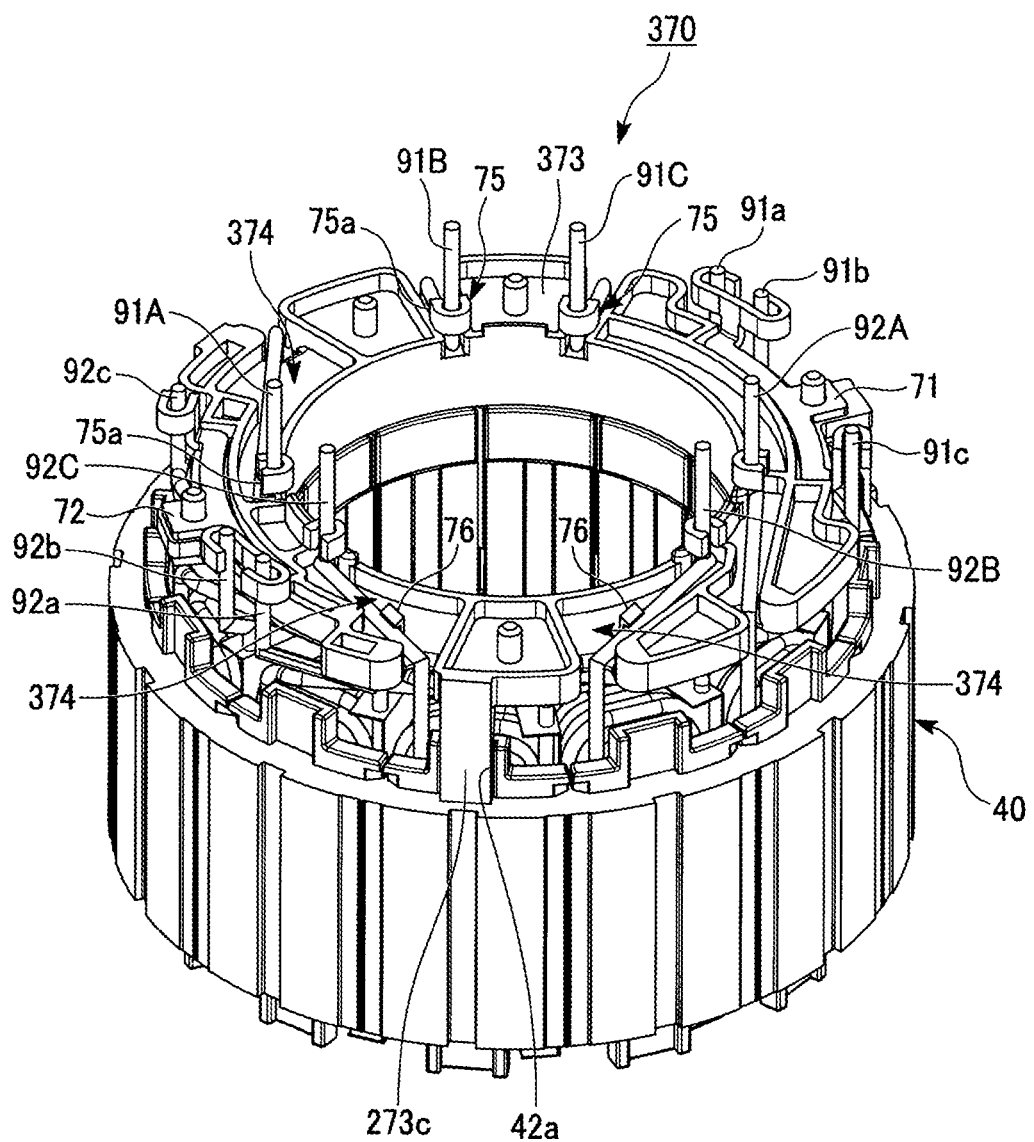
FIG. 8 is a perspective view illustrating a wire support member according to Modification Example 2 in the motor of FIG. 1.

FIG. 8 is a perspective view illustrating a wire support member 370 according to Modification Example 2 of the preferred embodiment.

In FIG. 8, instead of the wire support member 70 illustrated in FIG. 1 or 2, the wire support member 370 is attached to the motor 10. The wire support member 370 has a plurality of wire holding portions 75, a first neutral point bus bar 71, a second neutral point bus bar 72, and a main body portion 373. In FIG. 8, the number of the wire holding portions 75 is six.

The main body portion 373 is an annular member in plan view. The six wire holding portions 75 are disposed on the inner peripheral edge of the main body portion 373. The first neutral point bus bar 71 and the second neutral point bus bar 72 are attached to the outer peripheral portion of the main body portion 373.

The recessed portion 374 is disposed on the upper surface of the main body portion 373. The coil lead wires 91A to 91C and 92A to 92C extending from the stator 40 are wound around from the outer peripheral side to the upper surface of the main body portion 373 and are accommodated in the recessed portion 374. The coil lead wires 91A to 91C and 92A to 92C extend to the wire holding portion 75 at the inner peripheral edge along the upper surface of the main body portion 373. The coil lead wires 91A to 91C and 92A to 92C are held by the wire holding portion 75.

The main body portion 373 has a fixing portion 76 that fixes or locks the coil lead wires 92B and 92C to the upper surface of the main body. More specifically, the fixing portion 76 extending in the axial direction is disposed in the recessed portion 374. In Modification Example 2, the fixing portion 76 is substantially L-shaped. The tip end of the fixing portion 76 extends outward in the radial direction from the inside in the radial direction. The coil lead wires 92B and 92C are disposed between the fixing portion 76 and the upper surface of the main body portion 373. Preferably, the fixing portion 76 is in contact with the coil lead wire 92B and 92C in the axial direction and the radial direction. As a result, it is possible to prevent the coil lead wires 92B and 92C from floating from the main body portion 373. In addition, even when an external force or the like is applied to the motor 10 and the coil lead wires 92B and 92C attempt to move on the upper surface of the main body portion 373, the coil lead wires hit the fixing portion 76, so that it is possible to suppress the movement of the coil lead wires 92B and 92C in the radial direction. The fixing portion 76 may be provided in all of the plurality of recessed portions 374 or may be provided only in a portion of the recessed portion 374. In addition, the shape of the fixing portion 76 is not limited to the above-described shape, and may be another shape. The fixing portion 76 may interpose a portion of the coil lead wires 92B and 92C.

In the configuration of Modification Example 2, the coil lead wires 91A to 91C and 92A to 92C are drawn out on the upper surface of the main body portion 373. That is, the main body portion 373 is disposed between the stator 40 and the coil lead wires 91A to 91C and 92A to 92C. As a result, it is possible to insulate the stator 40 from the coil lead wires 91A to 91C and 92A to 92C. In addition, the fixing portion 76 suppresses movement of the coil lead wires 92B and 92C on the upper surface of the main body portion 373. The main body portion 373 is disposed between the coil lead wires 91A to 91C and 92A to 92C and the bearing holder 55. As a result, insulation between the coil lead wires 91A to 91C and 92A to 92C and the bearing holder 55 can be ensured. Unlike the configuration of Modification Example 1, in Modification Example 2, the coil lead wires 91A to 91C and 92A to 92C are exposed to the outside of the recessed portion 374. Therefore, from the viewpoint of insulation, it is preferable that the coil lead wires 91A to 91C and 92A to 92C are disposed away from the bearing holder 55. The insulating member such as an insulating tube may be attached to the coil lead wires 91A to 91C and 92A to 92C.

Figure 9:
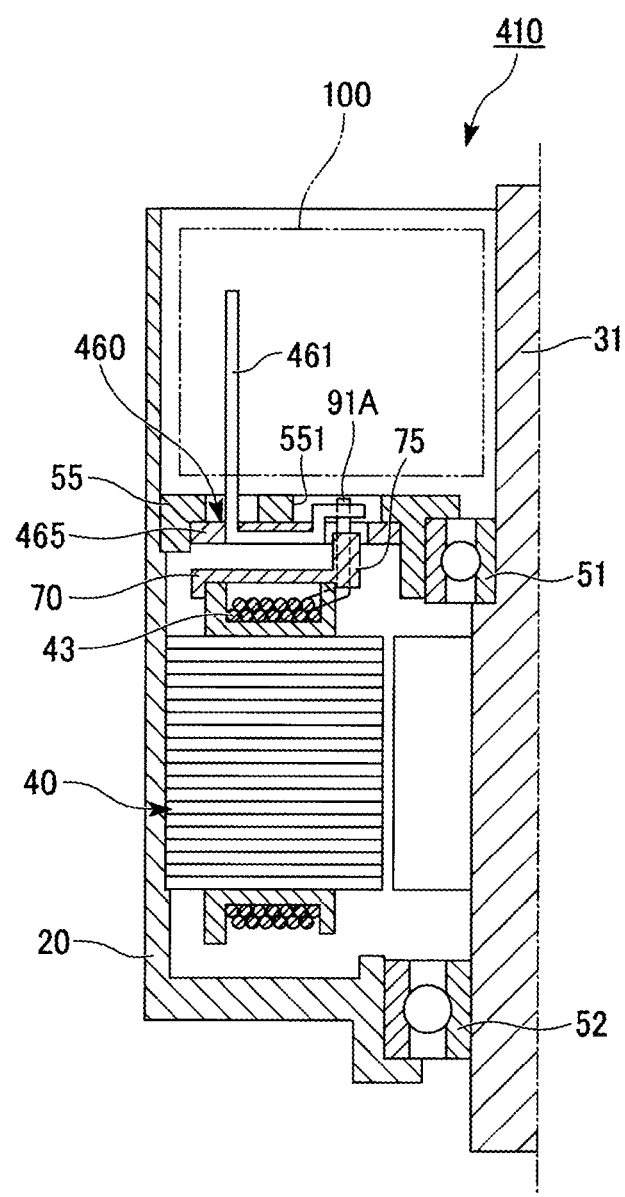
FIG. 9 is a partial cross-sectional view illustrating a motor according to Modification Example 3 of the present embodiment.

FIG. 9 is a partial cross-sectional view illustrating a motor 410 according to Modification Example 3 of the preferred embodiment.

In the motor 10 illustrated in FIG. 1, the bus bar unit 60 is fixed to the upper surface of the bearing holder 55. On the other hand, the motor 410 illustrated in FIG. 9 is provided with a bus bar unit 460 fixed to the lower surface of the bearing holder 55. The bus bar unit 460 has a bus bar 461 and a bus bar holder 465 that holds the bus bar 461. The bus bar 461 is connected to the coil lead wire 91A held by the wire holding portion 75. The bus bar 461 extends upward the bearing holder 55 via the through-hole of the bearing holder 55, and is connected to the control device 100.

The bus bar unit 460 has a bus bar connected to the coil lead wires 91A to 91C and 92A to 92C. In FIG. 9, only the bus bar 461 connected to the coil lead wire 91A is illustrated and bus bars connected to the other coil lead wires 91B, 91C, and 92A to 92C are not illustrated.

In the configuration of Modification Example 3, the bus bar unit 460 is fixed to the lower surface of the bearing holder 55. Therefore, even when the stator 40, the wire support member 70, and the like are shifted from the predetermined position in the axial direction, the upper end of the bus bar 461 can be accurately positioned with respect to the housing 20. Therefore, it is possible to stably connect the bus bar 461 and the control device 100 to each other.

The portion connected to the coil lead wire 91A in the bus bar 461 is positioned in the through-hole 551 provided in the bearing holder 55. As a result, the axial dimension between the portion and the bearing holder 55 can be reduced.

Figure 10:
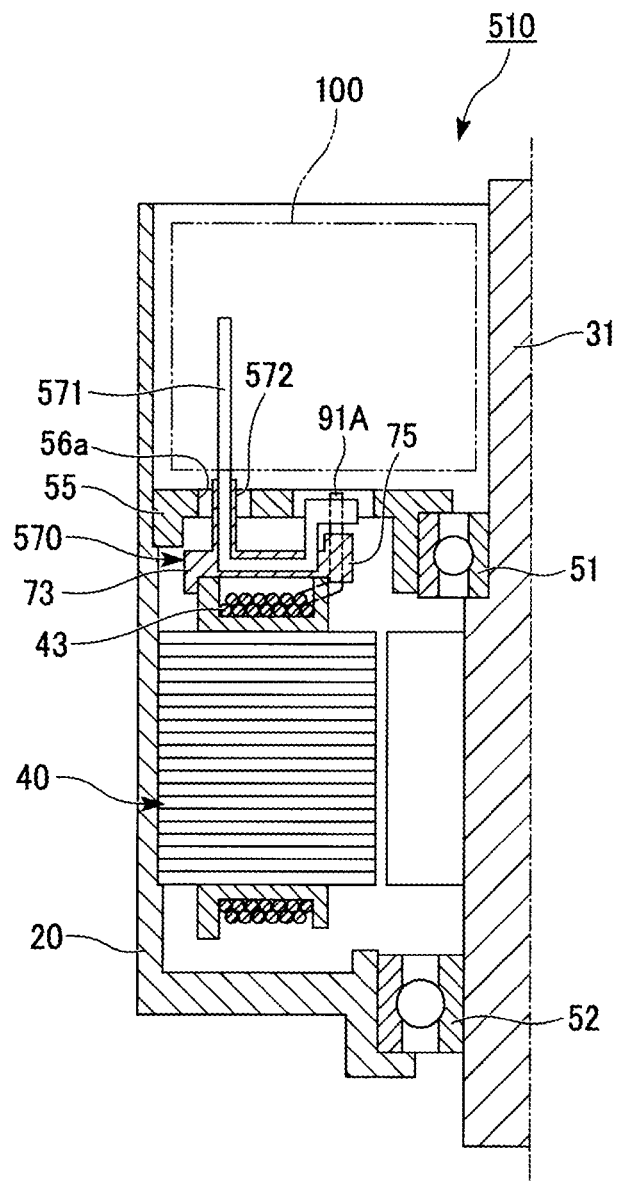
FIG. 10 is a partial cross-sectional view illustrating a motor according to Modification Example 4 of the present embodiment.

FIG. 10 is a partial cross-sectional view illustrating a motor 510 according to Modification Example 4.

As illustrated in FIG. 10, the motor 510 has a wire support member 570. The wire support member 570 has a configuration in which a connection terminal 571 is provided in the wire support member 70 illustrated in FIGS. 1 and 2. The connection terminal 571 is fixed to the main body portion 73 of the wire support member 570. One end portion of the connection terminal 571 is connected to the coil lead wire 91A held by the wire holding portion 75. The other end portion of the connection terminal 571 extends upward the bearing holder 55 through the through-hole 56a of the bearing holder 55 and is connected to the control device 100.

The wire support member 570 has a terminal holding portion 572. The terminal holding portion 572 covers a portion of the connection terminal 571 passing through the through-hole 56a. The terminal holding portion 572 is an insulating material, and can electrically insulate the connection terminal 571 from the bearing holder 55.

In FIG. 10, the wire support member 570 has connection terminals connected to the coil lead wires 91A to 91C and 92A to 92C. In FIG. 10, only the connection terminal 571 connected to the coil lead wire 91A is illustrated and connection terminals connected to the other coil lead wires 91B, 91C, and 92A to 92C are not illustrated.

In Modification Example 4, the wire support member 570 is provided with the connection terminal 571. Therefore, in the motor 510, a bus bar unit connected to the control device 100 is unnecessary. As a result, the number of parts can be reduced, and the size of the motor 510 can be reduced in the axial direction.

Figure 11:
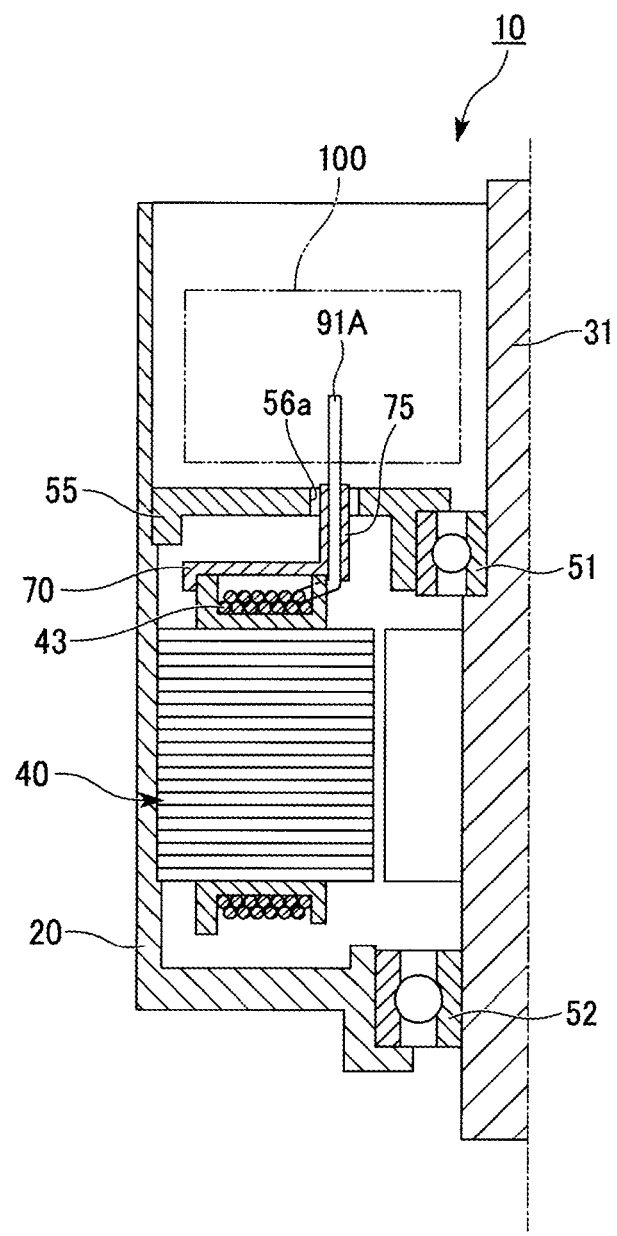
FIG. 11 is a partial cross-sectional view illustrating a motor according to Modification Example 5 of the present embodiment.

FIG. 11 is a partial cross-sectional view illustrating a motor 10 according to Modification Example 5. Unlike the structure of the motor 10 illustrated in FIGS. 1 and 2, in the motor 10 of Modification Example 5, the bus bar unit 60 is not provided and the coil lead wire 91A and the control device 100 are directly connected to each other. In this structure, since the bus bar unit 60 is unnecessary, the number of parts can be reduced and the size of the motor can be reduced in the axial direction.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
a rotor that includes a shaft with a central axis extending in a vertical direction as a center;
a stator opposing the rotor in a radial direction;
a bearing that supports the shaft; a wire support member above the stator;
a bearing holder above the wire support member to hold the bearing; and
a bus bar unit above the wire support member, wherein the stator includes:
a plurality of teeth, and
a plurality of coils provided on the plurality of teeth, the plurality of coils including coil lead wires,
the wire support member includes:
a wire holding portion that holds one portion of the coil lead wires extending upward from the coils,
a neutral point bus bar that electrically connects other ones of the coil lead wires to each other, and
a main body portion that supports the wire holding portion and the neutral point bus bar,
the bus bar unit includes:
a phase bus bar connected to the one of the coil lead wires held by the wire holding portion, and
a bus bar holder that holds the phase bus bar,
the bearing holder includes at least one through-hole which penetrates the bearing holder in an axial direction and through which a coil end of the one of the coil lead wires passes,
the bus bar unit is above the bearing holder,
the phase bus bar is connected to the coil end of the one of the coil lead wires,
the main body portion includes a cutout portion,
the other ones of the coil lead wires are below the main body portion and the neutral bus bar and the other ones of the coil lead wires are exposed through the cutout portion in the axial direction, and
the cutout portion has a fan-shaped outer shape in a plan view from the axial direction.

2. The motor according to claim 1, wherein the one of the coil lead wires extending upward from the coils passes through between the main body portion and the stator to extend to the wire holding portion, and an insulating member is attached to the one of the coil lead wires positioned between the stator and the main body portion.

3. The motor according to claim 1, wherein the main body portion includes an upper support member and a lower support member opposing each other in the axial direction, the upper support member includes the wire holding portion, and the one of the coil lead wires extends upward from the coils to an upper surface of the lower support member and passes between the upper support member and the lower support member to extend to the wire holding portion.

4. The motor according to claim 1, wherein the one of the coil lead wires extends upward from the coils to an upper surface of the main body portion, and extends to the wire holding portion along the upper surface of the main body portion.

5. The motor according to claim 4, wherein the main body portion includes a fixing portion that fixes the one of the coil lead wires to the upper surface of the main body portion.

6. The motor according to claim 1,
wherein the wire holding portion includes a recessed portion opened in a direction orthogonal to the central axis at an edge portion of the main body portion.

7. The motor according to claim 1,
wherein the wire holding portion includes another through-hole that penetrates the main body portion in the axial direction.

8. The motor according to claim 6,
wherein the wire holding portion includes a support wall portion that protrudes upward from the main body portion and supports the one portion of the coil lead wires.

9. The motor according to claim 1,
wherein all the coil lead wires are drawn out above the stator.

10. The motor according to claim 1, further comprising:
a housing that accommodates the stator and the rotor,
wherein the housing includes a bottom wall portion on a lower side in the axial direction, and an opening portion through which the stator is capable of passing on an upper side in the axial direction.

11. The motor according to claim 10,
wherein a shelf surface that opposes the opening portion and extends in a circumferential direction is provided on an inner surface of the housing,
the bearing holder is in contact with the shelf surface, and
the bus bar unit is fixed to an upper surface of the housing.

12. The motor according to claim 10, further comprising:
a control portion accommodated in the housing, and electrically connected to the one of the coil lead wires directly or via the phase bus bar.

13. A motor comprising:
a rotor that includes a shaft with a central axis extending in a vertical direction as a center;
a stator opposing the rotor in a radial direction;
a bearing that supports the shaft;
a wire support member above the stator; and
a bearing holder above the wire support member to hold the bearing, wherein
the stator includes:
a plurality of teeth, and
a plurality of coils provided on the plurality of teeth, the plurality of coils including coil lead wires,
the wire support member includes:
a wire holding portion that holds one of the coil lead wires extending upward from the coil,
a first conducting member that electrically connects other ones of the coil lead wires to each other, and
a main body portion that supports the wire holding portion and the first conducting member,
the main body portion includes a recessed portion on an upper surface of the main body portion, and a fixing portion that fixes or locks the one of the coil lead wires,
the recessed portion retains the one of the coil lead wires;
the one of the coil lead wires is bent upward in the axial direction at an inner peripheral edge of the main body portion and is led to extend diagonally in both the radial direction and a circumferential direction from an outer peripheral edge of the main body portion to the inner peripheral edge of the main body portion, and
the bearing holder includes a through-hole that penetrates through the bearing holder in an axial direction, and a coil end of the one of the coil lead wires passes through the through-hole to extend upward the bearing holder.

14. The motor according to claim 13,
wherein the one of the coil lead wires between the main body portion and the stator to extend to the wire holding portion, and
an insulating member is attached to the one of the coil lead wires positioned between the stator and the main body portion.

15. The motor according to claim 13,
wherein the wire holding portion includes a recessed portion opened in a direction orthogonal to the central axis at an edge portion of the main body portion.

16. The motor according to claim 13,
wherein the wire holding portion includes a through-hole that penetrates the main body portion in the axial direction.

17. The motor according to claim 15,
wherein the wire holding portion includes a through-hole that penetrates the main body portion in the axial direction.

18. The motor according to claim 13,
wherein all the coil lead wires are drawn out above the stator.

19. The motor according to claim 13, further comprising:
a housing that accommodates the stator and the rotor,
wherein the housing includes a bottom wall portion on a lower side in the axial direction, and an opening portion through which the stator is capable of passing on an upper side in the axial direction.

20. The motor according to claim 19,
wherein a shelf surface that opposes the opening portion and extends in a circumferential direction is provided on an inner surface of the housing,
the bearing holder is in contact with the shelf surface, and
a bus bar unit is fixed to an upper surface of the housing.

21. The motor according to claim 19, further comprising:
a control portion accommodated in the housing, and electrically connected to the one of the coil lead wires directly or via a second conducting member.

* * * * *